(12) United States Patent
Wen

(10) Patent No.: US 10,851,900 B2
(45) Date of Patent: Dec. 1, 2020

(54) FAUCET VALVE CORE

(71) Applicant: Xiaofeng Wen, Zhejiang (CN)

(72) Inventor: Xiaofeng Wen, Zhejiang (CN)

( * ) Notice: Subject to any disclaimer, the term of this patent is extended or adjusted under 35 U.S.C. 154(b) by 16 days.

(21) Appl. No.: 16/277,483

(22) Filed: Feb. 15, 2019

(65) Prior Publication Data

US 2019/0178397 A1 Jun. 13, 2019

Related U.S. Application Data

(63) Continuation of application No. PCT/CN2017/096473, filed on Aug. 8, 2017.

(30) Foreign Application Priority Data

Aug. 15, 2016 (CN) .......................... 2016 1 0668090

(51) Int. Cl.
*F16K 11/074* (2006.01)
*F16K 3/30* (2006.01)
*F16K 11/22* (2006.01)
*F16K 11/20* (2006.01)

(52) U.S. Cl.
CPC .............. *F16K 11/074* (2013.01); *F16K 3/30* (2013.01); *F16K 11/0743* (2013.01); *F16K 11/202* (2013.01); *F16K 11/22* (2013.01)

(58) Field of Classification Search
CPC .. F16K 11/074; F16K 11/202; F16K 11/0743; F16K 11/22; Y10T 137/86871
USPC .................................................... 137/625.47
See application file for complete search history.

(56) References Cited

U.S. PATENT DOCUMENTS

| 3,987,819 | A | * | 10/1976 | Scheuermann | F16K 11/0746 137/637.3 |
| 5,070,906 | A | * | 12/1991 | Orlandi | F16K 11/161 137/606 |
| 7,143,786 | B2 | * | 12/2006 | Romero | F16K 3/08 137/606 |

FOREIGN PATENT DOCUMENTS

| CN | 201301983 Y | 9/2009 |
| CN | 101660622 A | 3/2010 |
| CN | 102252110 A | 11/2011 |
| CN | 102777633 A | 11/2012 |
| CN | 103307292 A | 9/2013 |
| CN | 103542133 A | 1/2014 |
| CN | 205026122 U | 2/2016 |
| CN | 106090309 A | 11/2016 |
| CN | 206175723 U | 5/2017 |
| EP | 0454629 A1 | 10/1991 |

* cited by examiner

*Primary Examiner* — Michael R Reid

(57) ABSTRACT

A fixed valve plate having a fixed valve central water passage and a fixed valve side water passage; a first movable valve plate having a first movable valve central water passage; and a second movable valve plate having a second movable valve central water passage and a second movable valve side water passage; wherein two end surfaces of the second movable valve plate are respectively sealedly attached to corresponding end surfaces of the first movable valve plate and the fixed valve plate; and wherein rotating of the first movable valve plate causes the first movable valve central water passage and the second movable valve central water passage communicated or noncommunicating, and rotating of the second movable valve plate causes the second movable valve side water passage and the fixed valve side water passage communicated or noncommunicating.

10 Claims, 5 Drawing Sheets

FAUCET VALVE CORE

TECHNICAL FIELD

The present invention relates to a faucet valve core.

BACKGROUND

An invention patent application entitled "a faucet valve core" filed by the applicant in 2011 (Application No: 201110073428.5), in which two components, i.e. flow control component and temperature control component, are arranged vertically, with a water delivery component is arranged between the flow control component and the temperature control component. Since there are various designs for the water delivery component which determine the quality thereof. Accordingly, different designs have different service lifes, functions, and costs.

In injection molding, the bottom water passage is required to fully cover corresponding water channel in a tube for demolding. Since the outside diameter of the tube in flow control movable valve plate accessory should not be too large due to the size limit of the product, and the bottom water passage of the flow control movable valve plate accessory must be off center by a certain distance to make the bottom water passage and corresponding water channel in the tube eccentric or approximately concentric, only a bottom water passage in the shape of rectangle would cover corresponding water channel in an tube. In condition of covering or opening same-sized water holes with the movable valve plate moving axially, the larger distance the water hole off-center, the smaller angle the movable valve plate moves axially, which allows the water flow to be controlled by means of toggling and sliding valve plate. Otherwise, moving axially with too large angle would result in a groove for handle on a housing of valve core being too wide, which results in a weak housing of the valve core, or result in no space for other components, for example, a partition wall between two water holes, and so on. In the meanwhile, there is no space in the fixed valve plate for the tube with too large outer diameter. Furthermore, the larger the outside diameter of the tube, the poorer the sealing effect of inner hole. Only the bottom water passage of the flow control movable valve plate accessory and the water hole of the flow control movable valve plate are both in the shape of circle and are concentric, inner hole sealing can be provided at the engagement position between the bottom water passage of the flow control movable valve plate accessory and the water hole of the flow control movable valve plate. Otherwise, only plane sealing can be applied, which requires to secure and fasten the bottom water passage of the flow control movable valve plate accessory and the water hole of the flow control movable valve plate by screw or snap-fit. However, the aforementioned security would be loosening continually under freezing, high pressure or material deformation, and cannot be recovered by itself.

The cold water and the hot water in the tube of the flow control movable valve plate accessory distribute in water channels at left and right sides respectively, and thus two sides of the tube have different temperatures. During use, thermal expansion and contraction of material causes the deformation of the outer profile, which affects sealing effect of inner hole in outer wall of tube. In addition, two water passages are separated with the partition wall which induces tension in the process of injection molding and leads to the outer profile of tube non-circular, and the sealing effect of inner hole is affected.

SUMMARY

In view of the problems of the prior art, the object of the present invention is to provide a faucet valve core with the advantages of the components thereof having simple manufacturing processes, guaranteed quality and perfect functions.

To achieve the above described object, the present invention provides a faucet valve core comprising a fixed valve plate having a fixed valve central water passage and a fixed valve side water passage; a first movable valve plate having a first movable valve central water passage; and a second movable valve plate having a second movable valve central water passage and a second movable valve side water passage; wherein the second movable valve plate is arranged between the first movable valve plate and the fixed valve plate, and two end surfaces of the second movable valve plate are respectively sealedly attached to corresponding end surfaces of the first movable valve plate and the fixed valve plate; and wherein rotating of the first movable valve plate causes the first movable valve central water passage and the second movable valve central water passage communicated or noncommunicating, and rotating of the second movable valve plate causes the second movable valve side water passage and the fixed valve side water passage communicated or noncommunicating.

According to the above described design, cold water flow and hot water flow can be controlled independently by turning the first movable valve plate to cause the first movable valve central water passage and the second movable valve central water passage communicated or noncommunicating, and by turning the second movable valve plate to cause the second movable valve side water passage and fixed valve side water passage communicated or noncommunicating, so as to control the flow rate of cold water and hot water and the water temperature. Furthermore, all of the fixed valve central water passage and the fixed valve side water passage, the first movable valve central water passage, and the second movable valve central water passage and the second movable valve side water passage can be arranged axially, which simplifies the manufacturing process.

Further, the faucet valve core further comprises a first rotating element coupled to the first movable valve plate, and a second rotating element coupled to the second movable valve plate.

According to the above described design, cold water flow and hot water flow can be controlled independently by turning the first rotating element, which drives the first movable valve plate to rotate to cause the first movable valve central water passage and the second movable valve central water passage communicated or noncommunicating, and by turning the second rotating element, which drives the second movable valve plate to rotate to cause the second movable valve side water passage and fixed valve side water passage communicated or noncommunicating, respectively, so as to control the flow rate of cold water and hot water and the water temperature.

Further, the first movable valve central water passage is eccentrically provided in the first movable valve plate and the second movable valve central water passage is eccentrically provided in the second movable valve plate.

According to the above described design, the structure is simpler and the manufacturing process is more convenient.

Further, the fixed valve central water passage is concentrically provided in the fixed valve plate.

According to the above described design, the second rotating element rotates and drives the second movable valve plate to rotate so as to cause the second movable valve side water passage and fixed valve side water passage communicated or noncommunicating, and the first rotating element rotates to drive the first movable valve plate to rotate so as to cause the first movable valve central water passage and the second movable valve central water passage communicated or noncommunicating.

Further, the fixed valve central water passage is eccentrically provided in the fixed valve plate.

According to the above described design, the second rotating element rotates and drives the second movable valve plate to rotate so as to cause the second movable valve side water passage and fixed valve side water passage communicated or noncommunicating, and in the meanwhile, to cause the second movable valve central water passage and the fixed valve central water passage communicated or noncommunicating. Further, the first rotating element rotates to drive the first movable valve plate to rotate so as to cause the first movable valve central water passage and the second movable valve central water passage communicated or noncommunicating.

Further, the faucet valve core further comprises a third movable valve plate having a third movable valve side water passage and being coupled to the first rotating element, and a fourth movable valve plate having a fourth movable valve side water passage and being coupled to the second rotating element, wherein the third movable valve plate and the fourth movable valve plate are both mounted around the first rotating element, when the third movable valve plate and the fourth movable valve plate rotate relative to each other, the third movable valve side water passage and the fourth movable valve side water passage are communicated or noncommunicating.

According to the above described design, by means of the cooperation of the toggling of the central water passages of the first movable valve plate and the second movable valve plate, which controls one of the cold water flow and the hot water flow, and the toggling of the third movable valve plate and the fourth movable valve plate, which controls the other of the cold water flow and the hot water flow, the cold water flow and the hot water flow can be controlled simultaneously upon operating the first rotating element 4, the flow rate and the water temperature can be controlled respectively.

Further, the first rotating element is provided with an inner water hole, the second rotating element is provided with an outer water hole, when the first rotating element and the second rotating element rotate relative to each other, the inner water hole and the outer water hole are communicated or noncommunicating.

According to the above described design, by means of the cooperation of the toggling of the central water passages of the first movable valve plate and the second movable valve plate, which controls one of the cold water flow and the hot water flow, and the toggling of the inner water hole and the outer water hole, which controls the other of the cold water flow and the hot water flow, cold water flow and hot water flow can be controlled simultaneously upon operating the first rotating element, the flow rate and the water temperature can be controlled respectively.

Further, the fixed valve central water passage and the fixed valve side water passage are arranged with a certain angel formed therebetween, and accordingly the second movable valve central water passage and the second movable valve side water passage are arranged with a certain angel formed therebetween.

According to the above described design, two water flows and temperature adjustment can be controlled respectively.

Further, the first rotating element comprises an inner rotating key, and the first movable valve plate is provided with a first movable valve groove engaging with the inner rotating key; the second rotating element comprises an outer rotating key, and the second movable valve plate is provided with a second movable valve groove engaging with the outer rotating key.

According to the above described design, the first rotating element is coupled with the first movable valve plate, and the second rotating element is coupled with the second movable valve plate, which makes the structure simpler.

Further, the faucet valve core further comprises a base having a bottom central water passage and a bottom side water passage which communicate with the fixed valve central water passage and the fixed valve side water passage respectively, and an outer housing which is connected with the base and accommodates the fixed valve plate, the first movable valve plate, the second movable valve plate, the first rotating element and the second rotating element, wherein the fixed valve plate is located on the base.

According to the above described design, modularly replacing of the faucet valve core is more convenient.

The present invention is explained in greater detail using the accompanying drawings.

DESCRIPTION OF THE EMBODIMENTS

Figure 1:
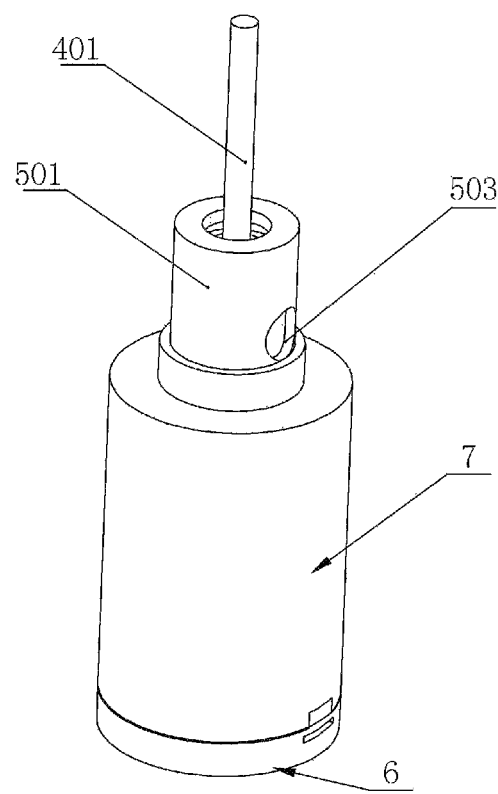
FIG. 1 is a perspective view of a first embodiment according to the present invention.
Figure 2:
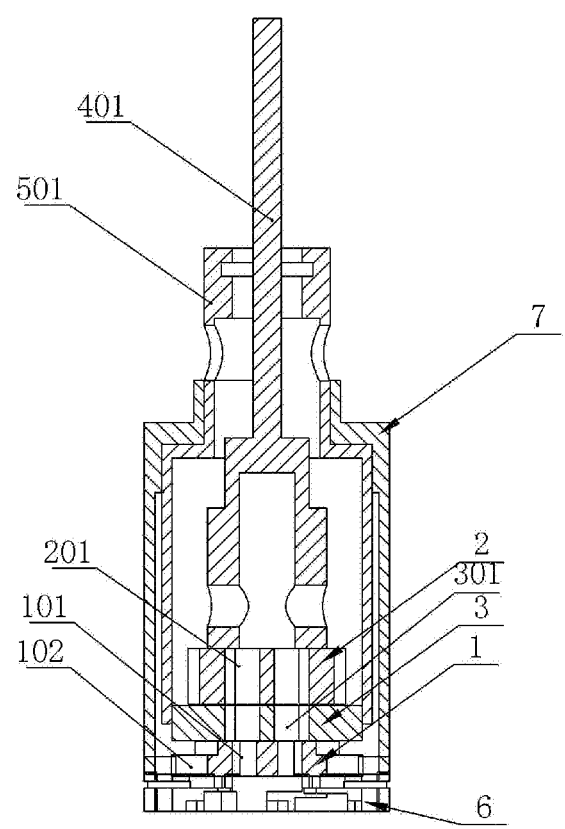
FIG. 2 is a sectional view of the first embodiment according to the present invention.
Figure 3:
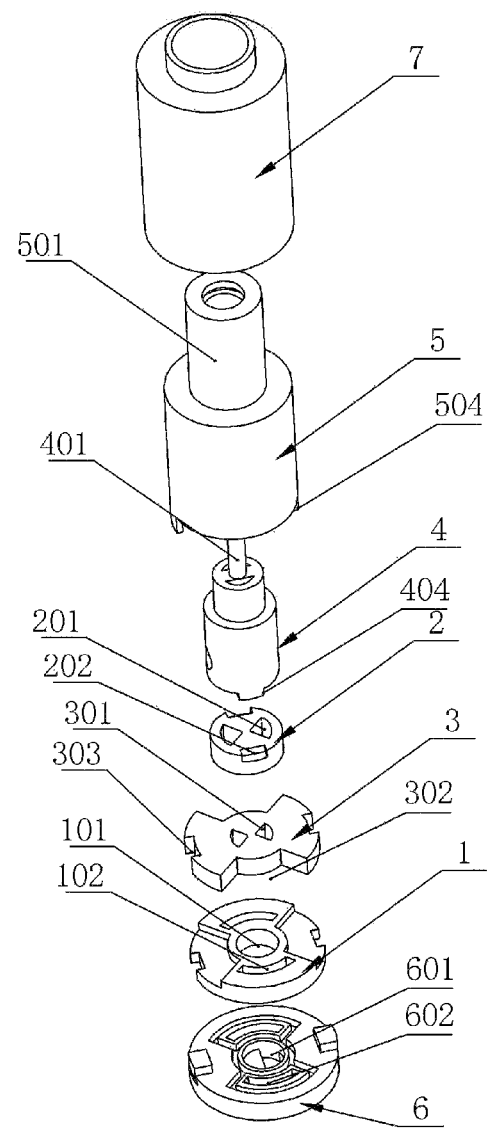
FIG. 3 is an exploded view of the first embodiment according to the present invention.
Figure 4:
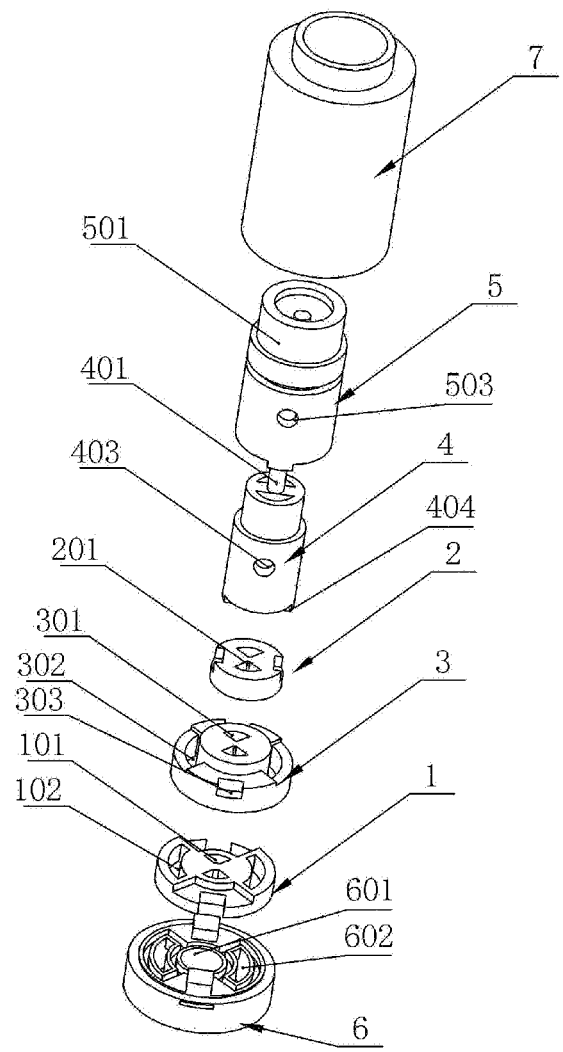
FIG. 4 is an exploded view of a second embodiment according to the present invention.
Figure 5:
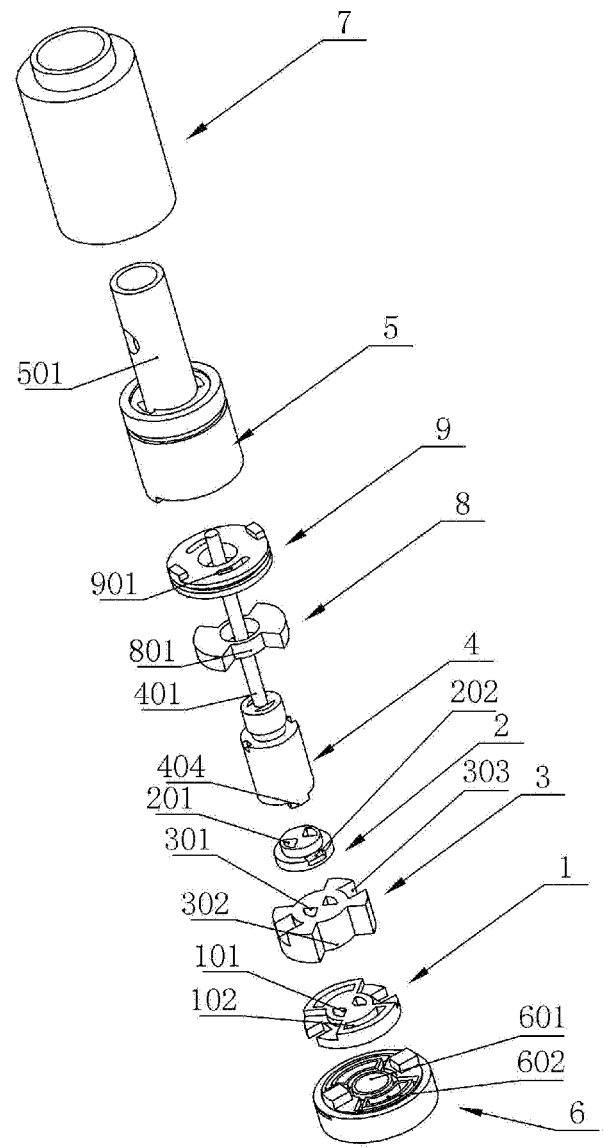
FIG. 5 is an exploded view of a third embodiment according to the present invention.

Referring to FIGS. 1-5.

A faucet valve core in according with the present invention includes a fixed valve plate 1, a first movable valve plate 2, a second movable valve plate 3, a first rotating element 4 and a second rotating element 5. The second movable valve plate 3 is arranged between the first movable valve plate 2 and the fixed valve plate 1, and two end surfaces of the second movable valve plate 3 are respectively sealedly attached to corresponding end surfaces of the first movable valve plate 2 and the fixed valve plate 1. The first rotating element 4 is rotatably arranged in the second rotating element 5. The fixed valve plate 1 is provided with a fixed valve central water passage 101 and fixed valve side water passages 102. The first movable valve plate 2 is provided with first movable valve central water passages 201. The second movable valve plate 3 is provided with second movable valve central water passages 301 and second movable valve side water passages 302. The first rotating element 4 is coupled with the first movable valve plate 2, and when the first rotating element 4 rotates, it drives the first movable valve plate 2 to rotate so as to cause the first movable valve central water passage 201 and the second movable valve central water passage 301 communicated or noncommunicating. The second rotating element 5 is coupled with the second movable valve plate 3, and when the second rotating element 5 rotates, the second rotating element 5 drives the second movable valve plate 3 to rotate so as to cause the second movable valve side water passage 302 and the fixed valve side water passage 102 communicated or noncommunicating. According to the above described design, cold water flow and hot water flow can be controlled independently by turning the first rotating element 4, which drives the first movable valve plate 2 to rotate to cause the first movable valve central water passage 201 and the second movable valve central water passage 301 communicated or noncommunicating, and by turning the second rotating element 5, which drives the second movable valve plate 3 to rotate to cause the second movable valve side water passage 302 and fixed valve side water passage 102 communicated or noncommunicating, respectively, so as to control the flow rate of cold water and hot water and the water temperature. Furthermore, all of the fixed valve central water passage 101 and the fixed valve side water passage 102, the first movable valve central water passage 201, and the second movable valve central water passage 301 and the second movable valve side water passage 302 can be arranged axially, which simplifies the manufacturing process.

Further, the first movable valve central water passage 201 and the second movable valve central water passage 301 are eccentrically provided in the first movable valve plate 2 and the second movable valve plate 3 respectively. According to the above described design, the structure is simpler and the manufacturing process is more convenient.

In the first embodiment, further, the fixed valve central water passage 101 is concentrically provided in the fixed valve plate 1. According to the above described design, the second rotating element 5 rotates and drives the second movable valve plate 3 to rotate so as to cause the second movable valve side water passage 302 and fixed valve side water passage 102 communicated or noncommunicating, and the first rotating element 4 rotates to drive the first movable valve plate 2 to rotate so as to cause the first movable valve central water passage 201 and the second movable valve central water passage 301 communicated or noncommunicating.

According to a second embodiment, the fixed valve central water passages 101 are eccentrically provided in the fixed valve plate 1. The first rotating element 4 is provided with inner water holes 403, the second rotating element 5 is provided with outer water holes 503, and when the first rotating element 4 and the second rotating element 5 rotate relative to each other, the inner water hole 403 and the outer water hole 503 are communicated or noncommunicating. According to the above described design, the second rotating element 5 rotates and drives the second movable valve plate 3 to rotate so as to cause the second movable valve side water passage 302 and fixed valve side water passage 102 communicated or noncommunicating, and in the meanwhile, to cause the second movable valve central water passage 301 and the fixed valve central water passage 101 communicated or noncommunicating. Further, the first rotating element 4 rotates to drive the first movable valve plate 2 to rotate so as to cause the first movable valve central water passage 201 and the second movable valve central water passage 301 communicated or noncommunicating. By means of the cooperation of the toggling of the central water passages of the first movable valve plate 2 and the second movable valve plate 3, which controls one of the cold water flow and the hot water flow, and the toggling of the inner water hole 403 and the outer water hole 503, which controls the other of the cold water flow and the hot water flow, the cold water flow and the hot water flow can be controlled simultaneously upon operating the first rotating element 4, the flow rate and the water temperature can be controlled respectively.

In a third embodiment, the fixed valve central water passages 101 are eccentrically provided in the fixed valve plate 1. The faucet valve core further includes a third movable valve plate 8 and a fourth movable valve plate 9. The third movable valve plate 8 is provided with third movable valve side water passages 801, and the fourth movable valve plate 9 is provided with fourth movable valve side water passages 901. The third movable valve plate 8 and the fourth movable valve plate 9 are both mounted around the first rotating element 4. The third movable valve plate 8 and the first rotating element 4 are coupled to each other, and the fourth movable valve plate 9 and the second rotating element 5 are coupled to each other. When the third movable valve plate 8 and the fourth movable valve plate 9 rotate relative to each other, the third movable valve side water passage 801 and the fourth movable valve side water passage 901 are communicated or noncommunicating. According to the above described design, by means of the cooperation of the toggling of the central water passages of the first movable valve plate 2 and the second movable valve plate 3, which controls one of the cold water flow and the hot water flow, and the toggling of the third movable valve plate 8 and the fourth movable valve plate 9, which controls the other of the cold water flow and the hot water flow, cold water flow and hot water flow can be controlled simultaneously upon operating the first rotating element 4, the flow rate and the water temperature can be controlled respectively.

Further, the central angle of the fixed valve central water passage 101 and the fixed valve side water passage 102 are arranged with a certain angel formed therebetween, and accordingly the second movable valve central water passage 301 and the second movable valve side water passage 302 are arranged with a certain angel formed therebetween. According to the above described design, two water flows and temperature adjustment can be controlled respectively.

Further, the first rotating element 4 has an inner operation portion 401, the second rotating element 5 has an outer operation portion 501, and the inner operation portion 401 extends to the outside of the second rotating element 5 through the outer operation portion 501. According to the above described design, the first rotating element 4 and the second rotating element 5 can be operated by means of the inner operation portion 401 and the outer operation portion 501 respectively.

Further, the first rotating element 4 has inner rotating keys 404, and the first movable valve plate 2 has first movable valve grooves 202 engaging with the inner rotating keys 404. The second rotating element 5 has outer rotating keys 504, and the second movable valve plate 3 has second movable valve grooves 303 engaging with the outer rotating keys 504. According to the above described design, the first rotating element 4 is coupled with the first movable valve plate 2, and the second rotating element 5 is coupled with the second movable valve plate 3, which makes the structure simpler.

Further, the faucet valve core includes a base 6 and an outer housing 7. The base 6 is provided with a bottom central water passage 601 and bottom side water passages 602 which communicate with the fixed valve central water passages 101 and the fixed valve side water passages 102 respectively. The fixed valve plate 1 is located on the base 6. The outer housing 7 is connected with the base 6 and accommodates the fixed valve plate 1, the first movable valve plate 2, the second movable valve plate 3, the first rotating element 4 and the second rotating element 5. According to the above described design, modularly replacing of the faucet valve core is more convenient.

What is claimed is:

1. A faucet valve core comprising:
   a fixed valve plate having a fixed valve central water passage and a fixed valve side water passage;
   a first movable valve plate having a first movable valve central water passage; and
   a second movable valve plate having a second movable valve central water passage and a second movable valve side water passage;
   wherein the second movable valve plate is arranged between the first movable valve plate and the fixed valve plate, and two end surfaces of the second movable valve plate are respectively sealedly attached to corresponding end surfaces of the first movable valve plate and the fixed valve plate; and
   wherein rotating of the first movable valve plate causes the first movable valve central water passage and the second movable valve central water passage to communicate or not communicate, and rotating of the second movable valve plate causes the second movable valve side water passage and the fixed valve side water passage to communicate or not communicate.

2. The faucet valve core of claim 1, further comprising a first rotating element coupled to the first movable valve plate, and a second rotating element coupled to the second movable valve plate.

3. The faucet valve core of claim 2, wherein the first movable valve central water passage is eccentrically provided in the first movable valve plate and the second movable valve central water passage is eccentrically provided in the second movable valve plate.

4. The faucet valve core of claim 3, wherein the fixed valve central water passage is concentrically provided in the fixed valve plate.

5. The faucet valve core of claim 3, wherein the fixed valve central water passage is eccentrically provided in the fixed valve plate.

6. The faucet valve core of claim 5, further comprising a third movable valve plate having a third movable valve side water passage and being coupled to the first rotating element, and a fourth movable valve plate having a fourth movable valve side water passage and being coupled to the second rotating element, wherein the third movable valve plate and the fourth movable valve plate are both mounted around the first rotating element, when the third movable valve plate and the fourth movable valve plate rotate relative to each other, the third movable valve side water passage and the fourth movable valve side water passage are to communicate or not communicate.

7. The faucet valve core of claim 5, wherein the first rotating element is provided with an inner water hole, the second rotating element is provided with an outer water hole, when the first rotating element and the second rotating element rotate relative to each other, the inner water hole and the outer water hole are to communicate or not communicate.

8. The faucet valve core of claim 5, wherein the fixed valve central water passage and the fixed valve side water passage are arranged with a certain angle formed therebetween, and accordingly the second movable valve central water passage and the second movable valve side water passage are arranged with a certain angle formed therebetween.

9. The faucet valve core of claim 2, wherein the first rotating element comprises an inner rotating key, and the first movable valve plate is provided with a first movable valve groove engaging with the inner rotating key; the second rotating element comprises an outer rotating key, and the second movable valve plate is provided with a second movable valve groove engaging with the outer rotating key.

10. The faucet valve core of claim 2, further comprising a base having a bottom central water passage and a bottom side water passage which communicate with the fixed valve central water passage and the fixed valve side water passage respectively, and an outer housing which is connected with the base and accommodates the fixed valve plate, the first movable valve plate, the second movable valve plate, the first rotating element and the second rotating element, wherein the fixed valve plate is located on the base.

\* \* \* \* \*